United States Patent Office 2,705,710
Patented Apr. 5, 1955

2,705,710

ACID CATALYZED ESTERIFICATION OF CELLULOSE PRETREATED WITH AN N,N-DIALKYL AMIDE

Roe C. Blume, Waynesboro, Va., assignor to E. I. du Pont de Nemours and Company, Wilmington, Del., a corporation of Delaware No Drawing. Application February 8, 1952,
Serial No. 270,772

20 Claims. (Cl. 260—229)

This invention relates to the production of organic esters of cellulose. More specifically, it relates to a process which permits a rapid, high temperature esterification of cellulose which yields a product of uniform solubility, good filterability and high molecular weight.

Cellulose is usually esterified by the slow addition at elevated temperature of an acid anhydride to a slurry of cellulose in anhydrous acid. A strong inorganic acid is incorporated in the reaction mixture as a catalyst. It has been observed that extended contact with such strong inorganic acid even in catalytic amounts causes degradation of the cellulose molecule, especially at relatively high reaction temperatures. Excessive degradation results in depolymerization of the cellulose molecule to such an extent that the films and filaments produced from the final ester are of a quality and strength too low for practical purposes. When rapid addition of the acid anhydride is resorted to in an effort to reduce the period during which the reaction progresses under degrading conditions local reaction and spot heating occurs. This leads to formation of a heterogeneous product which is difficult to prepare for dry spinning from an organic solvent due to its solubility variations and poor filterability. As a result, the esterification step is often preceded by a cellulose activation process to effect a reduction of this period of exposure to catalyst under esterification conditions. One such activation procedure consists in heating the cellulose in a bath of anhydrous (glacial) acetic acid or other carboxylic acid as a diluent and solvent to which a minor amount of sulfuric acid has been added. Beside such activation, and often in conjunction with it, temperatures lower than optimum for esterification are at times resorted to in an effort to reduce deleterious degradation.

It is an object of the present invention to provide a process for the production of esters of cellulose without excessive degradation of the cellulose molecule.

Another object is to provide a process for the production of esters of cellulose without the necessity of an acid activation of the cellulosic material.

Another object is to provide a process for the production of esters of cellulose which avoids the use of the conventionally employed concentrated (glacial) acetic or other carboxylic acid as diluent or solvent.

A further object is to provide a rapid, high temperature process for the production of esters of cellulose which will provide a homogeneous, easily-filtered product of uniform solubility.

In accordance with the present invention, these objects are accomplished by adding sulfuric acid in catalytic amounts to a hot slurry of cellulose in an N,N-dialkylamide into which has been stirred sufficient acetic anhydride to carry acetylation to completion, i. e., to cellulose triacetate.

The following examples illustrate a method of carrying out the process. They are presented merely by way of illustration and not by way of limitation. Where the value "relative viscosity" is reported, it refers to that value obtained by dividing the viscosity at 25° C. of a 0.095% solution in 92% aqueous acetic acid by the viscosity at the same temperature of 92% aqueous acetic acid.

Example I

Five (5) grams of cotton linters are added to 100 grams of dimethylformamide. Agitation is provided and the resultant slurry is heated to a temperature of 140° C. After 10 minutes at temperature, 25 grams of hot acetic anhydride is stirred in. This is followed by 0.3 gram of concentrated sulfuric acid. The reaction requires about four minutes after addition of the catalyst.

Example II

Five (5) grams of cotton linters are added to 100 grams of dimethylformamide. The slurry is agitated and heated to 140° C. Upon reaching this temperature, 25 grams of hot acetic anhydride, followed by 0.25 gram of concentrated sulfuric acid solution are added. The reaction requires 2 minutes. The product has a relative viscosity of 1.149. In a similar batch where only 0.1 gram of sulfuric acid is added, the reaction is complete in 9 minutes. This product has a relative viscosity of 1.136.

Example III

Five (5) grams of cotton liners are added to 100 grams of dimethylacetamide. The resulting slurry is agitated and heated to 150° C. 25 grams of hot acetic anhydride are then added. This is followed by 0.25 gram of concentrated sulfuric acid. The reaction is complete in 3 minutes. The relative viscosity of the final product is 1.279.

A similar batch in which the sulfuric acid is reduced to 0.1 gram produces a product with a relative viscosity of 1.241 in a reaction period of 10 minutes.

The products of each of the above examples filters readily. Each is thereafter subjected to conventional partial hydrolysis to obtain the secondary or acetone soluble form. Filaments spun from these gums are of good quality and strength.

In general, the process is carried out by adding the cellulose to sufficient amide to form an easily-agitated slurry. The mixture is then heated to 100° C. or higher but less than the boiling point of the amide. This upper limit can be extended if the reaction is performed under pressure. However, care must be taken to avoid temperatures at which decomposition of cellulose will occur. Alternately, the cellulose may be added to an amide which has been preheated. It is not necessary to subject the slurry to elevated temperature for any extended period prior to commencement of the esterification proper. However, it has sometimes been found advantageous to hold the slurry at temperature for from 10 to 20 minutes before adding the esterifying agent and catalyst. Naturally, this period will vary considerably and will be dependent upon the type of cellulose, the particular amide, the temperature employed, and the like.

After the slurry has been brought up to temperature, the esterifying agent, e. g., acetic or other acid anhydride is stirred into it. The acid catalyst, usually sulfuric acid, is then added. The reaction is very rapid. The resulting product is filtered and thereafter saponified to the acetone soluble secondary acetate form and processed by dry extrusion, etc., according to conventional procedure.

Although the reaction occurs at a high temperature and with extreme rapidity, it has been found to yield cellulose esters of excellent quality, characterized by uniformity, high molecular weight with no evidence of substantial undesired side reactions.

The N,N-dialkylamides preferred as reaction media are the short chain N,N-dialkyl substituted amides of the lower fatty acids. Particularly effective among these are the short chain N,N-dialkyl substituted derivatives of formamide and acetamide. Among such compounds may be mentioned N,N-dimethylformamide, N,N-diethylformamide, N,N-dimethylacetamide, N,N-diethylacetamide, and the like.

Any cellulose suitable for esterification, such as refined cotton linters, high alpha-cellulose wood pulp, viscose rayon and the like, may be employed. If desired, it may be activated according to known procedures. The ratio of amide to cellulose may vary widely. Sufficient liquid should be present to afford a readily agitated slurry. In general, there should be about twenty times by weight more liquid than cellulose.

While the order of addition of the catalyst and the esterifying agent to the slurry of cellulose in amide is not critical, it has been found advantageous to add all of the esterifying agent prior to addition of the acid catalyst. Any of the usual esterifying agents such as the lower fatty acids or their anhydrides are suitable as are mixtures thereof. Among such acids and anhydrides may be mentioned those of acetic, propionic, and butyric. While the optimum ratio of esterifying agent to cellulose will depend on many factors, it has been found convenient to employ from four to ten times as much esterifying agent, i. e., acid or acid anhydride, by weight of cellulose.

Any conventional organic or inorganic acid esterification catalyst may be used. The mineral acids are most generally employed. Sulfuric acid is preferred due to its rapid action, low cost and ease of handling. As little as 0.1% by weight of sulfuric acid based on the total reactants has been found effective. Larger amounts, up to as much as 5%, may sometimes be found desirable.

Many other modifications within the inventive concept, without a departure therefrom, will be apparent to those skilled in the art.

What is claimed is:

1. A process for the esterification of cellulose comprising the steps of commingling cellulose with a short chain N,N-dialkyl substituted amide of a lower fatty acid, heating and then adding lower fatty acid esterifying agent and a strong inorganic acid catalyst.

2. The process as defined in claim 1 wherein the lower fatty acid is a member of the class consisting of formic and acetic.

3. The process as defined in claim 2 wherein the N,N-dialkylamide is N,N-dialkylformamide.

4. The process as defined in claim 3 wherein the N,N-dialkylformamide is N,N-dimethylformamide.

5. The process as defined in claim 3 wherein the N,N-dialkylformamide, is N,N-diethylformamide.

6. The process as defined in claim 2 wherein the N,N-dialkylamide is N,N-dialkylacetamide.

7. The process as defined in claim 6 wherein the N,N-dialkylacetamide is N,N-dimethylacetamide.

8. The process as defined in claim 6 wherein the N,N-dialkylacetamide is N,N-diethylacetamide.

9. The process as defined in claim 2 wherein the catalyst is sulfuric acid.

10. A process for the esterification of cellulose comprising the steps of commingling unactivated cellulose with a short chain N,N-dialkyl substituted amide of a lower fatty acid, heating and then adding acetylating agent and a strong inorganic acid catalyst.

11. A process as defined in claim 10 wherein the lower fatty acid is a member of the class consisting of formic and acetic and the alkyl substituent is a methyl group.

12. The process as defined in claim 10 wherein the N,N-dialkylamide is N,N-dimethylformamide.

13. The process as defined in claim 10 wherein the N,N-dialkylamide is N,N-dimethylacetamide.

14. A process as defined in claim 10 wherein the lower fatty acid is a member of the class consisting of formic and acetic and the alkyl substituent is an ethyl group.

15. The process as defined in claim 10 wherein the N,N-dialkylamide is N,N-diethylformamide.

16. The process as defined in claim 10 wherein the N,N-dialkylamide is N,N-diethylacetamide.

17. A process for the acetylation of cellulose comprising the steps of commingling unactivated cellulose with a short chain N,N-dialkyl substituted amide of a lower fatty acid, heating and then adding acetic anhydride and a strong inorganic acid catalyst.

18. The process as defined in claim 17 wherein the cellulose and the amide are heated to at least about 100° C. before addition of acetic anhydride and acid catalyst.

19. The process as defined in claim 18 wherein the cellulose and amide are heated at the elevated temperature for from about ten to about twenty minutes before the addition of the acetic anhydride and the catalyst.

20. The process as defined in claim 19 wherein the acid catalyst is sulfuric acid.

References Cited in the file of this patent

UNITED STATES PATENTS

| Number | Name | Date |
|---|---|---|
| 2,536,634 | Fraizy | Jan. 2, 1951 |
| 2,631,144 | Hiller | Mar. 10, 1953 |
| 2,632,007 | Blume et al. | Mar. 17, 1953 |

OTHER REFERENCES

Heuser: The Chemistry of Cellulose, John Wiley & Sons, Inc., September 1947, pages 228 and 256.